(12) United States Patent
Lagoe

(10) Patent No.: US 10,689,072 B2
(45) Date of Patent: Jun. 23, 2020

(54) DEVICE FOR REPAIRING A LEASH

(71) Applicant: Carey Lagoe, Sea Point (ZA)

(72) Inventor: Carey Lagoe, Sea Point (ZA)

(*) Notice: Subject to any disclaimer, the term of this patent is extended or adjusted under 35 U.S.C. 154(b) by 0 days.

(21) Appl. No.: 15/839,002

(22) Filed: Dec. 12, 2017

(65) Prior Publication Data
US 2019/0176940 A1   Jun. 13, 2019

(51) Int. Cl.
*B63B 35/85* (2006.01)
*B63B 35/79* (2006.01)
*F16G 11/06* (2006.01)

(52) U.S. Cl.
CPC .......... *B63B 35/7933* (2013.01); *B63B 35/85* (2013.01); *F16G 11/06* (2013.01); *B63B 2035/794* (2013.01)

(58) Field of Classification Search
CPC ...... B63B 35/7933; B63B 35/85; F16G 11/06
USPC ................................. 24/136 R, 136 B, 115 M
See application file for complete search history.

(56) References Cited

U.S. PATENT DOCUMENTS

| 1,751,572 | A | * | 3/1930 | Beemer | H01R 4/5025 24/136 B |
|---|---|---|---|---|---|
| 2,798,222 | A | * | 7/1957 | Evans | A42B 3/225 2/9 |
| 3,415,154 | A | * | 12/1968 | Skierski | F16B 23/0076 411/403 |
| 4,178,687 | A | * | 12/1979 | Wallshein | A61C 7/00 24/136 B |
| 4,938,725 | A | * | 7/1990 | Beck | B63B 35/7933 441/74 |
| 6,443,338 | B1 | * | 9/2002 | Giacona, III | A45C 13/30 224/148.6 |
| 2013/0223953 | A1 | * | 8/2013 | Thompson | F16B 37/14 411/366.1 |

* cited by examiner

*Primary Examiner* — Stephen P Avila
(74) *Attorney, Agent, or Firm* — Trego, Hines & Ladenheim, PLLC; Brandon Trego; Jonathan Hines

(57) ABSTRACT

A device is provided for repairing a leash. The device has a body defining an elongate slot for receiving severed ends of the leash. The slot has a wider section and a narrower section at one or both slot ends spaced apart from the wider section by a taper. Securing members are provided that are movable between a disengaged position in which the securing members are spaced apart from one or both slot ends and an engaged position in which each severed end is wedged and held captive between a securing member and a slot end.

12 Claims, 4 Drawing Sheets

DEVICE FOR REPAIRING A LEASH

FIELD OF THE INVENTION

The invention disclosed herein relates to a device for repairing a severed or damaged leash used to secure surfboards, bodyboards, paddleboards or the like to a limb of a user thereof.

BACKGROUND TO THE INVENTION

A leash, in surfing parlance, is a length of rope of which one end is connected to a surfboard and allows the surfer to anchor the surfboard to their person through the leash at a safe distance. A modern surf leash generally consists of three main parts, i.e. the "rail saver" which attaches to the surf board; the "cuff" which attaches to the surfer; and the cord extending between the rail saver and the cuff and which is generally a length of polyurethane cord. The cord of a modern leash typically connects to the cuff and the rail saver through a swivel that is intended to reduce tangling of the cord.

The general purpose of the leash is to enable surfers to easily recover their surfboards after having been separated therefrom. More than a mere convenience, the leash may be a critical safety device since it may allow a surfer to reach their board for use as a flotation device should they find themselves in trouble in the water. It may also prevent the surfboard from hitting and injuring fellow surfers in close proximity to a surfer that has been separated from their board for whatever reason.

Surfboard leashes come in a variety of lengths and widths and the choice of a leash and its dimensions may depend on the preferences of the surfer. For example, a thinner leash is weaker, but may create less drag through the water. Regardless of the dimensions thereof, a leash remains susceptible to damage and, ultimately, breakage. Simply tying a knot with the two severed ends will generally not hold, since the polyurethane material of the cord may likely cause the knot to become undone. Even if the leash is manufactured from other materials, it may also not hold a knot since the leash may be subjected to considerable tension during use.

Should a surfer's leash therefore become damaged and/or severed during use, and they are not equipped with a spare leash, the surfer is faced with two equally unattractive choices. The surfer could continue without a proper leash, which may expose the surfer and those around him or her to danger. Alternatively the surfer may be forced to retire for the day, which is also clearly undesirable.

US/20020132538 discloses a leash repair device used on a sporting leash, namely an aquatic leash, to restore the sporting leash as a unit after it has snapped into two pieces. The leash repair device incorporates a sleeve having at least one aperture and two receiving ends. Each piece of the snapped leash is inserted into the receiving ends of the sleeve and is fastened to the sleeve by introducing at least one fastener into and through the aperture until the fastener has come into direct contact with the leash. It teaches that the fasteners are screws that are fastened using a separate tool. This may be impractical and the need for an additional tool may render it unsuitable for on-the-fly leash repairs. Furthermore, the applicant believes that the use of screws as taught in US/20020132538 may damage the leash at the point of repair, thereby making the leash susceptible to further breakage when tension is applied during subsequent use.

The invention disclosed herein addresses these problems, at least to some extent, and may provide even further improvements.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this disclosure there is provided a device for repairing a leash comprising:
 a body defining an elongate slot for receiving at least one severed end of the leash, the slot having a wider section and a narrower section at one or both slot ends spaced apart from the wider section by a taper; and
 at least one securing member movable between a disengaged position in which the securing member is spaced apart from a slot end and an engaged position in which each severed end is wedged and held captive between a securing member and a slot end.

Further features provide for the slot to receive two severed ends of the leash, the slot having a narrower section at both slot ends spaced apart from the wider section by a taper; and for the device to include two securing members movable between a disengaged position in which the securing member is spaced apart from a slot end and an engaged position in which each severed end is wedged and held captive between a securing member and a slot end.

Further features provide for the body to be a threaded elongate body with its longitudinal axis coaxial with that of the slot, and for each securing member to be a threaded nut movable along the longitudinal axis of the body between the disengaged and engaged positions; for the body to have a transversely extending stopping formation at or near one of the slot ends being arranged to stop a nut when threaded against the stopping formation.

Further features provide for each taper to be formed by at least one rib projecting transversely into the slot from an inner surface of the slot; and for the taper to be formed by two mirror-image ribs.

Further features provide for the nuts to be four-sided; and for the sides of the nuts to be concave.

Further features provide for outer surfaces of the nuts to be textured for improved grip; and for the textured surface to include one or more of knurling, grooves, protruding dots, and dimples.

Further features provide for the body to have a tether aperture provided at one or both axial ends of the body for tethering the device; for one or both tether apertures to be provided with a tether; and for one severed end in use to be received through the slot and held captive between a securing member and a slot end with either a cuff or a rail saver of the leash being looped through the tether to complete the repair.

In a preferred embodiment, the slot has a wider section located centrally therein and a narrower section at both slot ends spaced apart from the wider section by a taper, each taper formed by two mirror-image ribs projecting transversely into the slot from an inner surface of the slot.

An embodiment of the invention will now be described, by way of example only, with reference to the accompanying drawings.

DETAILED DESCRIPTION WITH REFERENCE TO THE DRAWINGS

A device for repairing a leash is provided and an exemplary embodiment thereof is disclosed below. The leash may generally be a leash for securing a surfboard, bodyboard, paddleboard or any other piece of water sport equipment to the body of a user thereof. The device may generally be used to, possibly temporarily, secure the ends of a severed leash and in the exemplary embodiment below the exemplary application of a surfboard leash will be used for purposes of illustration. It should be appreciated, however, that the device may be used to repair most cord or rope-like items.

The device generally includes a body defining an elongate slot extending through the body for receiving the severed ends of the leash. Being elongate, the slot has two slot ends located at axially opposite ends of the slot. The slot may have a wider section and a narrower section at one, preferably both, slot ends spaced apart from the wider section by a taper. The severed ends of the leash may be inserted into and through the slot such that the severed ends protrude through the slot. Each severed end may then be wedged into a taper with the function of the taper being to pinch or grip the severed end to assist in securing the severed end.

The device furthermore includes one or two securing members, generally but not necessarily a securing member for each taper provided by the device, movable between a disengaged position in which the securing members are spaced apart from one or both slot ends and an engaged position in which each severed end is wedged and held captive between a securing member and a slot end.

Preferably each respective severed end is wedged into and gripped by a taper after which a securing member is utilized to wedge the severed end against the relevant slot end at or near which the taper it is gripped by is located.

Figure 1:
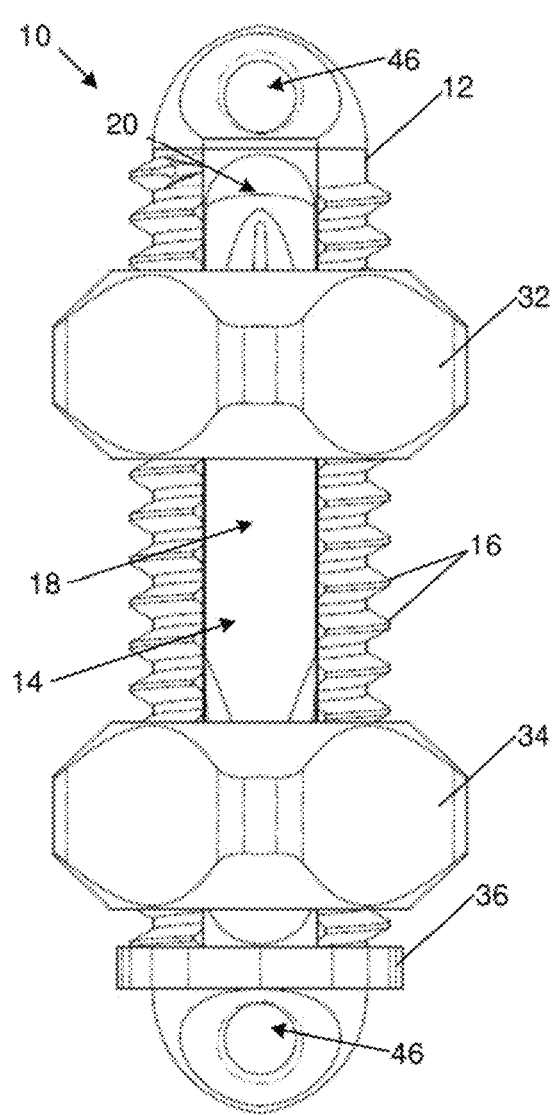
FIG. 1 is a side view of a device for repairing a leash.

FIG. 1 shows an exemplary embodiment of a device (10) for repairing a leash. The device (10) includes an elongate body (12) having an elongate slot (14) with the longitudinal axes of the body and slot substantially aligned. The body (12) is generally rod-shaped with thread (16) defined along an external surface thereof.

Figure 2:
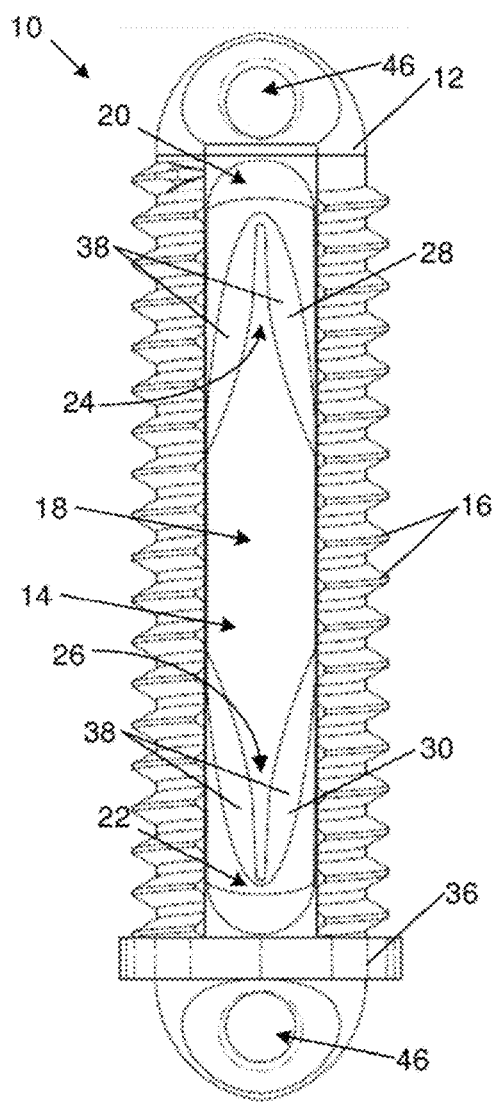
FIG. 2 is a side view of a body of the device of FIG. 1.

As more clearly shown in FIG. 2, the slot (14) has a wide section (18) in a central section of the slot that is dimensioned to allow severed ends of a damaged leash to pass through. Each slot end (20, 22) provides a narrow section (24, 26) the width of which is dimensioned to be smaller than the diameter or width of a leash. Each of the narrow sections of the slot (24, 26) are spaced apart from the wide section of the slot (18) by a taper (28, 30) with a substantially V-shaped profile. Each taper is formed by two mirror-image ribs (38) that each extend transversely into the slot (14) from opposite inner surfaces of the slot.

Figure 3:
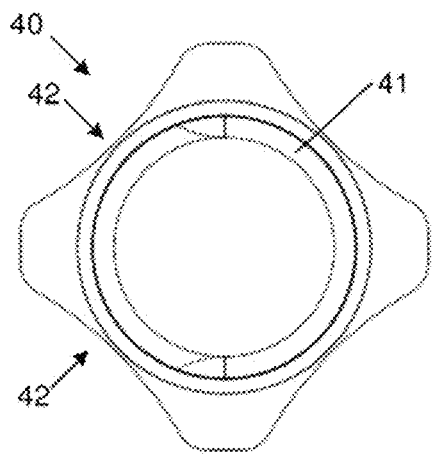
FIG. 3 is a top view of a nut shown in FIG. 1.
Figure 4:
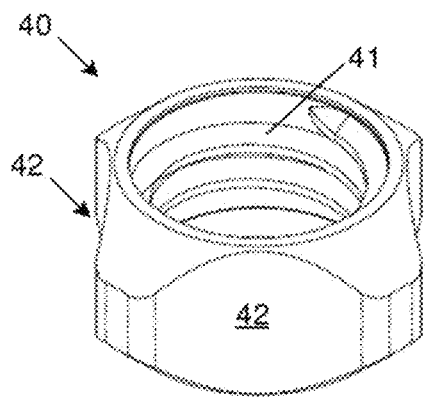
FIG. 4 is a three-dimensional view of the nut of FIG. 3.

The device (10) further includes two securing members which, in the present embodiment are four-sided nuts. As shown more clearly by FIGS. 3 and 4, each nut (40) is provided with internal thread (41) that allows it to be threaded onto the body (12). The nut sides (42) are concave and are textured to improve hand operated grip. In the present embodiment the textured sides (42) are formed by corresponding spark eroded sections in an injection mould wherein the device is manufactured. However, it is envisaged that the surface textures may be knurling, grooves, protruding dots, or dimples.

Referring back to FIGS. 1 and 2, the device (10) includes two nuts (32, 34) that, when threaded on the body (12), are movable longitudinally along the body and thus also the slot (14). The nuts (32, 34) are each movable between a disengaged position in which it is spaced apart from its corresponding slot end (20, 22) and an engaged position in which the nut (32, 34) is moved at or near its corresponding slot end (20, 22). Thus in use, as will be described in more detail below, a severed end extending through the slot may be wedged and held captive between the nut (32, 34) and the slot end (20, 22) when the nut is in the engaged position.

The body (12) has a stopping formation (36) extending transverse the longitudinal axis of the body located near one of the slot ends (22). The stopping formation (36) allows the nut (34) to be threaded securely against the stopping formation. The opposite end of the body (12) located adjacent the opposite slot end (20) does not have a similar stopping formation to allow the nuts (32, 34) to be threaded onto the body (12).

At each axial end of the body (12) a tether aperture (46) is provided. This allows the device (10) to be secured, when not in use, to a lanyard, keyring, carabiner or similarly appropriate securing mechanism.

Figure 5:
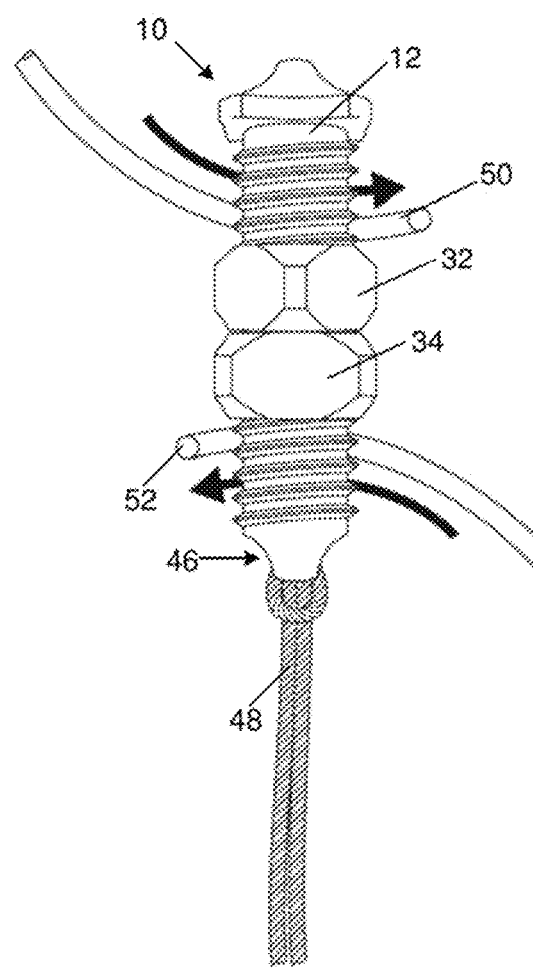
FIG. 5 is a side view of the device in use with severed ends of a leash with the nuts in the disengaged position.
Figures 6, 7:
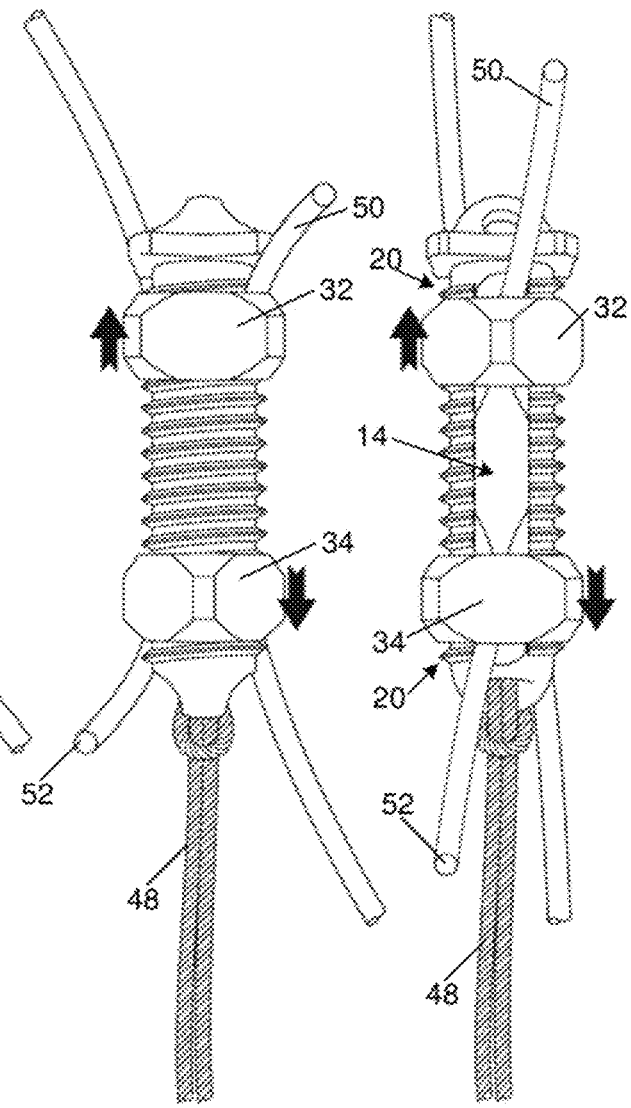
FIG. 6 is a side view of the device in use with severed ends of a leash with the nuts in the engaged position.
FIG. 7 is an alternative side view of the device of FIG. 6.

FIGS. 5 to 7 show the device (10) in use to repair the severed ends (50, 52) of a leash and having a tether (48) attached to one of the tether apertures (46) of the body (12). In FIG. 5, both nuts (32, 34) are positioned in the disengaged position in which they are spaced apart from the slot ends (20, 22). This provides an insertion space near the wide section (18) of the slot where the severed ends (50, 52) may be inserted into such that the respective severed ends (50, 52) are interposed between a nut (32, 34) and a corresponding slot end (20, 22). With the severed ends (50, 52) of the leash inserted into and through the slot (14), the respective nuts (32, 34) may be threaded along the body (12) toward their corresponding slot ends (20, 22) as shown in FIGS. 6 and 7.

FIGS. 6 and 7 show the nuts (32, 34) having been threaded toward the slot ends (20, 22) so as to be positioned in the engaged position. In the engaged position, the severed ends (50, 52) are wedged and held captive between the respective nuts (32, 34) and its corresponding slot end (20, 22). As the nut (32, 34) is threaded toward its respective slot end (20, 22), the nut will force the severed end (50, 52) toward and into the taper (28, 30) such that the severed end (50, 52) will be lodged into the taper. As mentioned above, the taper (28, 30) is formed such that the narrow end (24, 26) of the slot has a smaller width than the severed ends (50, 52). The taper (28, 30) will therefore assist in securing the severed end (50, 52) by pinching the severed end therein.

The combined forces of the pinching of the severed end (50, 52) by the taper (28, 30) and the severed end being wedged between the nut (32, 34) and the slot end (20, 22) provides a secure grasp of the device (10) onto the respective severed ends (50, 52).

Should the temporary repair no longer be required, the nuts (32, 24) may simply be threaded into the disengaged position and the severed ends (50, 52) removed from the device.

Figure 8:
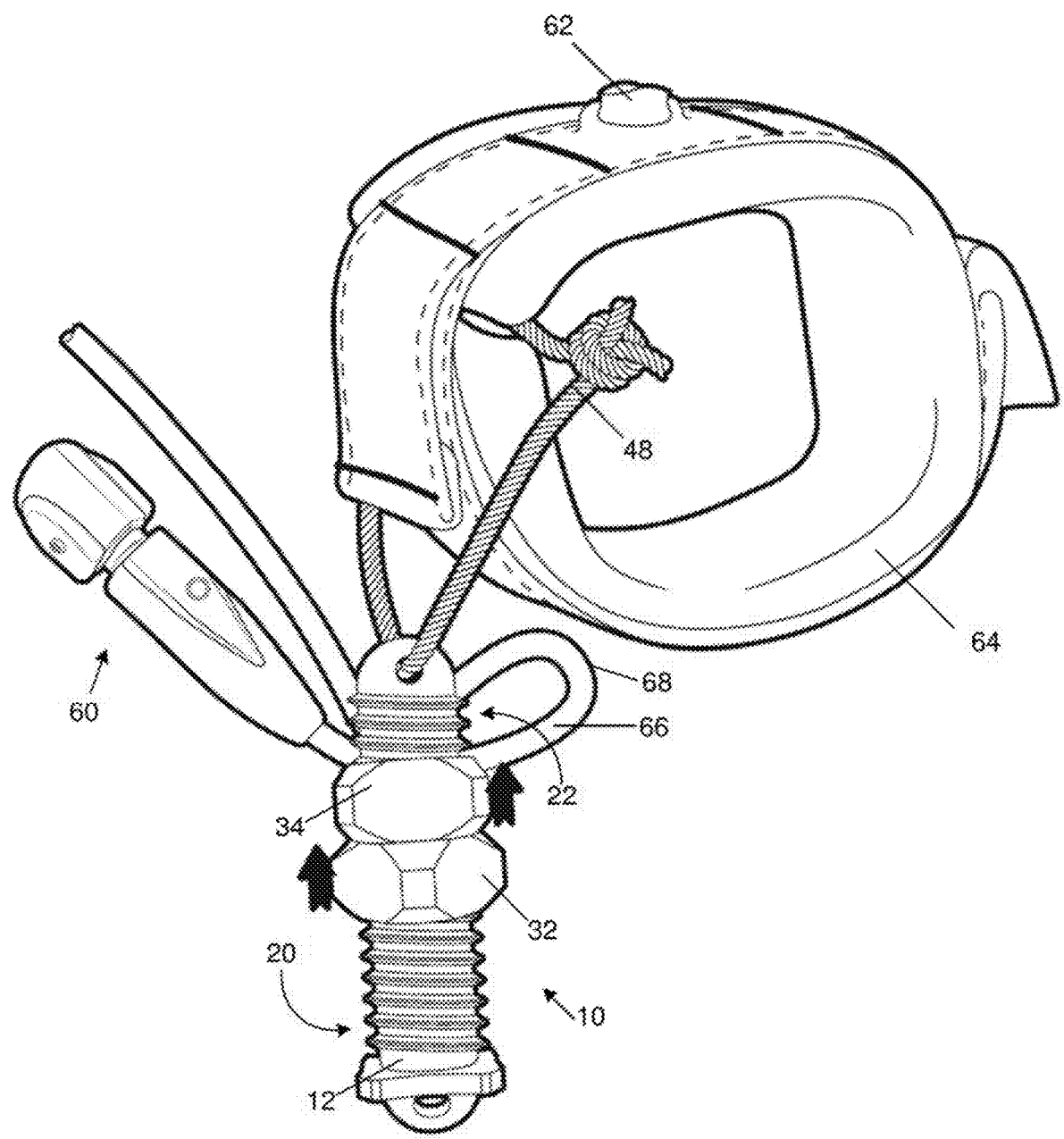
FIG. 8 is a three-dimensional view of the device in use to repair a leash that has been severed close to a swivel of the leash.

Often, leash breakages occur near the point of attachment of the central leash cord to either the cuff or the rail saver. Should the breakage occur at the swivel itself, the substantially larger width of the swivel in comparison with that of the cord would prevent this severed end to be passed through the slot (14) of the device (10). Similarly, should the cord be severed in close proximity to a swivel, an insufficient length of cord may remain on this severed end to be securely held within the device (10). FIG. 8 illustrates the former scenario where the swivel (60) has broken off at its connection point (62) to the cuff (64). The severed end in this scenario therefore includes a section of the swivel (60).

With the swivel (60) being too wide to pass through the slot (14) in the device (10), a section of the cord proximate the swivel may be folded onto itself to form an elongate loop (66) which will be used as the severed end. A closed end (68) of the loop (66) may then be inserted through the device (10) near the wide section (18) of the slot such that the closed end (68) of the loop (66) in the cord is interposed between a nut (32, 34) and a slot end (20, 22). With the end (68) of the loop inserted into and through the slot (14), one of the nuts (32, 34) may be threaded along the body (12) toward the corresponding slot ends (20, 22) to secure the severed end formed by the loop (66) between the particular nut and slot end. The cuff (64) is then looped through the tether (48) that is attached to one of the tether apertures (46) of the body (12) to complete the repair.

Should the breakage have occurred on the cord, but severed too close to the swivel (60) to allow sufficient grip on the remaining piece of cord attached thereto, the other severed end of the cord may be secured in the device as described above and the cuff (64) looped through the tether (48) to complete the repair. It will be appreciated that although this repair procedure has been described with reference to a breakage near the cuff, the same repair procedure may be employed to repair a breakage near the rail saver.

Figure 9:
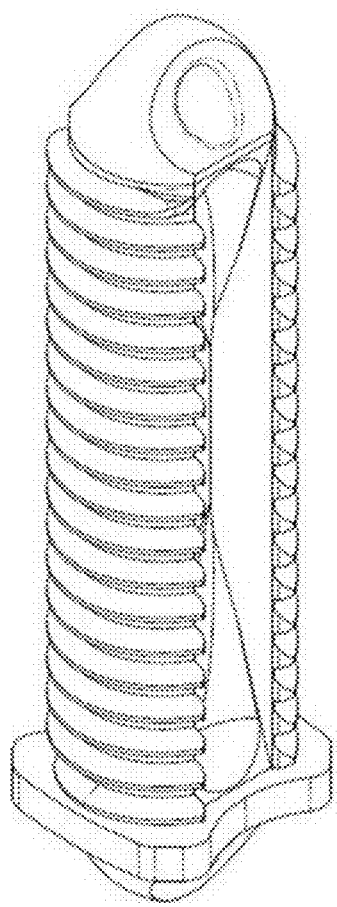
FIGS. 9 and 10 are three-dimensional views of the body of FIG. 2.
Figure 10:
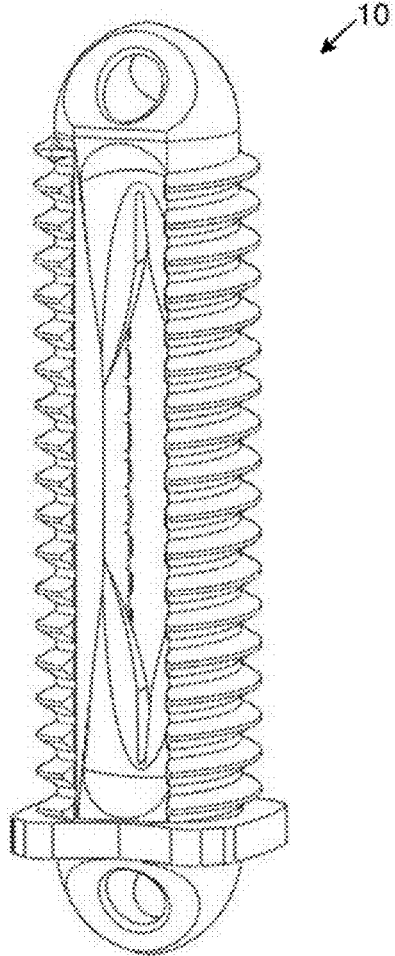
Figure 11:
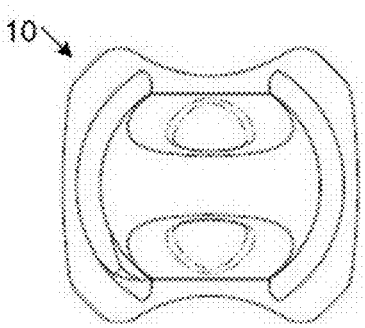
FIG. 11 is a top view of the body of FIG. 2.
Figure 12:
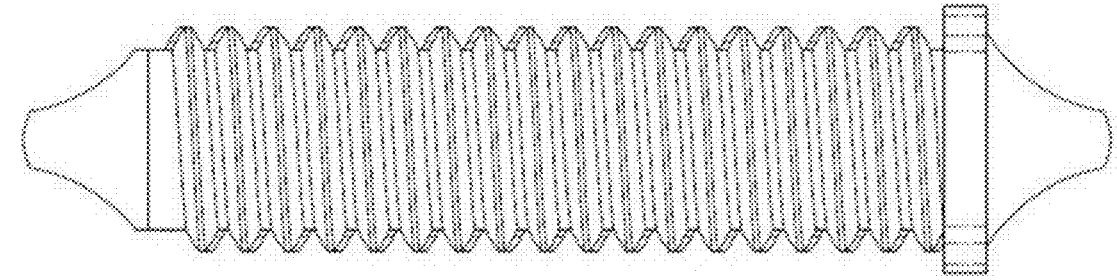
FIG. 12 is an alternative side view of the body of FIG. 2.

FIGS. 9 to 11 show various further views of the body (12) of the apparatus (10).

The present embodiment is manufactured from a plastic material since it is lightweight and corrosion resistant. However, any suitable material may be used and the type of material required or suitable may be determined by the type of leash, rope or cord with which it is to be used.

The leash repairing device (10) therefore provides a convenient and easily operable device for repairing a leash, even when the user is in the water. The over-sized nuts and their textured gripping surfaces makes it an effortless exercise to secure the ends of the leash therein, even with wet and cold hands. The small size and tethering apertures make it convenient for a surfer to carry the device on their person to have the device on hand whenever needed.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A device for repairing a leash comprising:
a threaded elongate body defining an elongate slot for receiving at least one severed end of the leash, a longitudinal axis of the body being coaxial with that of the slot and the slot having a wider section and a narrower section at one or both slot ends spaced apart from the wider section by a taper; and
one or two threaded nuts movable along the longitudinal axis of the body between a disengaged position in which the nuts are spaced apart from one or both slot ends and an engaged position in which each severed end is wedged and held captive between a nut and a slot end;
the body further having a transversely extending stopping formation at or near one of the slot ends arranged to stop a nut when threaded against the stopping formation.

2. A device as claimed in claim 1 wherein the slot is for receiving two severed ends of the leash, the slot having a narrower section at both slot ends spaced apart from the wider section by a taper, and wherein the device includes two threaded nuts movable between a disengaged position in which the nut is spaced apart from a slot end and an engaged position in which each severed end is wedged and held captive between a nut and a slot end.

3. A device as claimed in claim 1 wherein each taper is formed by at least one rib projecting transversely into the slot from an inner surface of the slot.

4. A device as claimed in claim 3 wherein each taper is formed by two mirror-image ribs.

5. A device as claimed in claim 1 wherein the nuts are four-sided.

6. A device as claimed in claim 5 wherein the sides of the nuts are concave.

7. A device as claimed in claim 6 wherein outer surfaces of the nuts are textured for improved grip.

8. A device as claimed in claim 7 wherein the textured surface to includes one or more of knurling, grooves, protruding dots, and dimples.

9. A device as claimed in claim 1 wherein the body has tether apertures provided at one or both axial ends of the body for tethering the device.

10. A device as claimed in claim 9 wherein one or both tether apertures are provided with a tether.

11. A device as claimed in claim 10 wherein in use one severed end is received through the slot and held captive between a nut and a slot end and wherein either a cuff or a rail saver of the leash is looped through the tether to complete the repair.

12. A device as claimed in claim 1 wherein the slot has a wider section located centrally therein and a narrower section at both slot ends spaced apart from the wider section by a taper, each taper formed by two mirror-image ribs projecting transversely into the slot from an inner surface of the slot.

* * * * *